(12) United States Patent
Celik et al.

(10) Patent No.: US 10,471,773 B2
(45) Date of Patent: Nov. 12, 2019

(54) METHOD OF MANUFACTURING A NON-PNEUMATIC SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US); Timothy Scott Miller, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 314 days.

(21) Appl. No.: 15/615,888

(22) Filed: Jun. 7, 2017

(65) Prior Publication Data

US 2018/0354316 A1 Dec. 13, 2018

(51) Int. Cl.
| | |
|---|---|
| *B60C 7/22* | (2006.01) |
| *B29D 30/02* | (2006.01) |
| *B60C 7/08* | (2006.01) |
| *B60C 7/00* | (2006.01) |
| *B60C 7/10* | (2006.01) |

(52) U.S. Cl.
CPC .............. *B60C 7/22* (2013.01); *B29D 30/02* (2013.01); *B60C 7/00* (2013.01); *B60C 7/08* (2013.01); *B60C 7/10* (2013.01); *B60C 7/102* (2013.01)

(58) Field of Classification Search
CPC .. B29D 30/005; B29D 30/02; B29D 30/0601; B60C 7/00; B60C 7/08; B60C 7/102; B60C 7/125; B60C 7/18; B60C 7/22; B60C 7/24; B60C 7/26; B60C 7/28; B60C 2007/005; B60B 9/26

USPC ......................................................... 156/112
See application file for complete search history.

(56) References Cited

U.S. PATENT DOCUMENTS

| | | |
|---|---|---|
| 479,255 A | 7/1892 | Dunlop |
| 482,175 A | 9/1892 | Hollafolla |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A | 11/1980 | Kahaner |
| 4,602,823 A | 7/1986 | Berg |
| 5,343,916 A | 9/1994 | Duddey |
| 5,800,643 A | 9/1998 | Frankowski |

(Continued)

OTHER PUBLICATIONS

U.S. Appl. No. 15/351,687, filed Nov. 15, 2016.

*Primary Examiner* — Robert C Dye
*Assistant Examiner* — Sedef E Paquette
(74) *Attorney, Agent, or Firm* — Robert N. Lipcsik

(57) ABSTRACT

A system manufactures a tire assembly. The system includes a core having a cylindrical hub and radially protruding extensions projecting radially outward from the hub, a plurality of internal arcuate members for positioning a reinforcing layer of the about the core, the internal arcuate members each being wrapped with a reinforcement layer, the internal arcuate members being disposed in spaces circumferentially between the extensions of the core, a first side plate for securing the internal arcuate members in place relative to the core; and a second side plate for securing the core and internal arcuate members to each other.

4 Claims, 11 Drawing Sheets

(56) References Cited

U.S. PATENT DOCUMENTS

| | | |
|---|---|---|
| 6,068,721 A | 5/2000 | Dyer |
| 6,260,598 B1 | 7/2001 | Tanaka |
| 8,962,120 B2 | 2/2015 | Delfino |
| 2004/0069385 A1 | 4/2004 | Timoney |
| 2010/0132858 A1* | 6/2010 | Arakawa .................. B60B 9/10 152/7 |
| 2010/0193097 A1 | 8/2010 | McNier |
| 2013/0167991 A1* | 7/2013 | Donohue ................ B60B 9/26 152/5 |

* cited by examiner

METHOD OF MANUFACTURING A NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A system in accordance with the present invention manufactures a tire assembly. The system includes a core having a cylindrical hub and radially protruding extensions projecting radially outward from the hub, a plurality of internal arcuate members for positioning a reinforcing layer of the about the core, the internal arcuate members each being wrapped with a reinforcement layer, the internal arcuate members being disposed in spaces circumferentially between the extensions of the core, a first side plate for securing the internal arcuate members in place relative to the core; and a second side plate for securing the core and internal arcuate members to each other.

According to another aspect of the system, each reinforcement layer comprises calendered fabric and rubber compound treatments.

According to still another aspect of the system, another reinforcement layer comprises calendered fabric and rubber compound treatments applied to an outer surface of the core across a full 360 degree circumference of the core.

According to yet another aspect of the system, wedges are disposed on the reinforcement layer in depressions between the extensions of the core and the internal arcuate members.

According to still another aspect of the system, the reinforcement layer comprises calendered fabric and rubber compound treatments applied to an outer surface of the core across a full 360 degree circumference of the core with a shear band structure applied over the reinforcement layer.

A method manufactures a non-pneumatic tire/wheel. The method comprises the steps of: providing calendered a reinforcement layer of fabric/cord and rubber compound treatments/sheets; wrapping part of the reinforcement layer around each of a plurality of internal arcuate members; laying another part of the reinforcement layer on an outer surface of a core across a full 360 degree circumference of the core; securing the reinforcement layer in position on the core by positioning internal arcuate members circumferentially between radial extensions of the core; fastening the core and internal arcuate members between a first side plate and a second side plate by securing the second side plate to the first side plate, the core, and the internal arcuate members with bolts; and placing wedges over the parts of the reinforcement layer in depressions between the extensions of the core and the internal arcuate members.

According to another aspect of the method, another step secures the wedges to the parts of the reinforcement layer by applying pressure.

According to still another aspect of the method, another step places a shear band component over the parts of the reinforcement layer and securing the shear band component to the parts of the reinforcement layer.

According to yet another aspect of the method, another step applies heat and pressure to cure rubber components of the non-pneumatic tire/wheel.

According to still another aspect of the method, another step secures the shear band component to the parts of the reinforcement layer by adhesive.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional tire assembly, such as that described in US 2004/0069385 and U.S. patent application Ser. No. 15/351,687, incorporated herein by reference in their entirety, and may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 10:
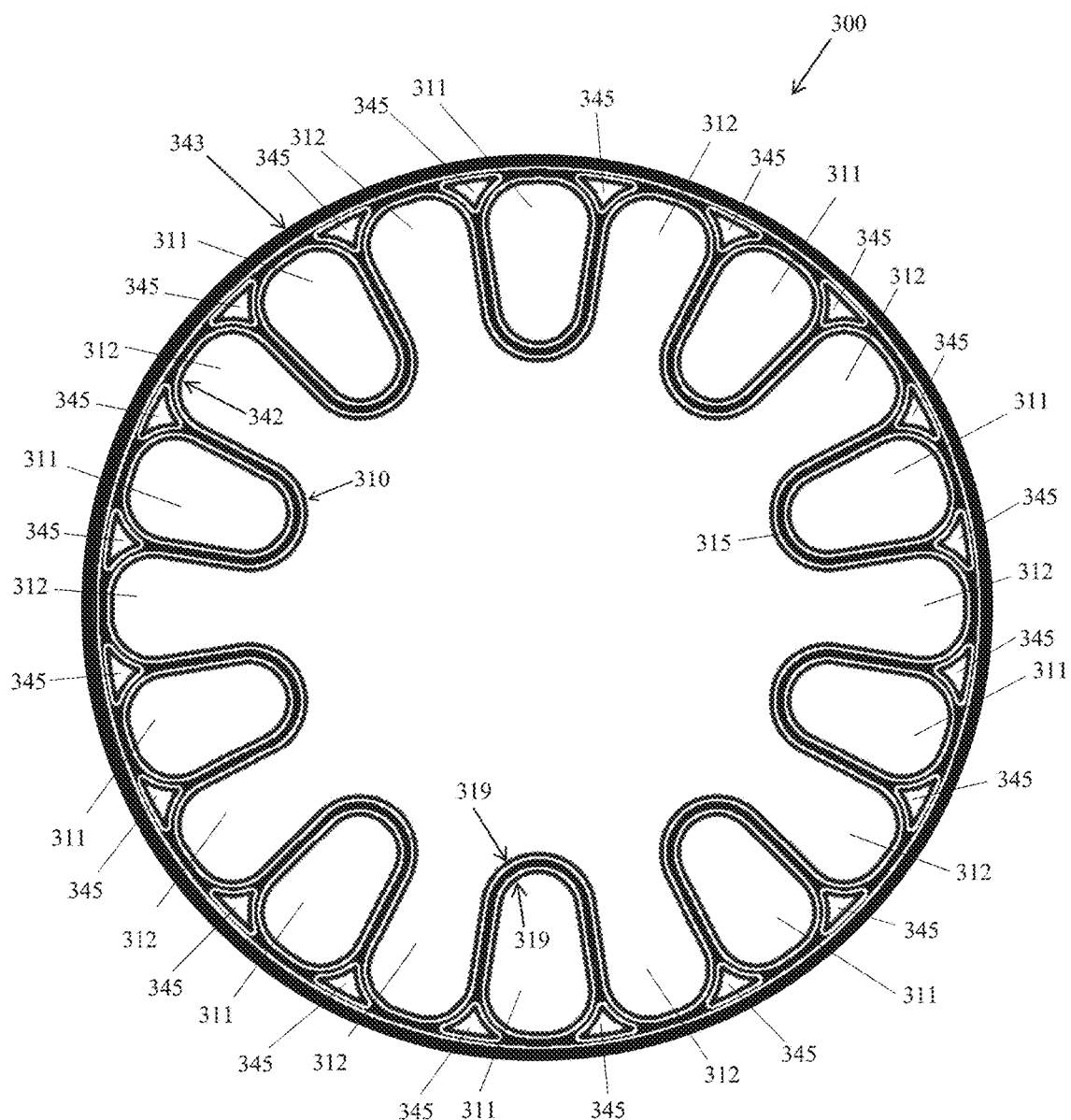
FIG. 10 is a schematic elevation view of the example tire assembly 300.
Figure 11:
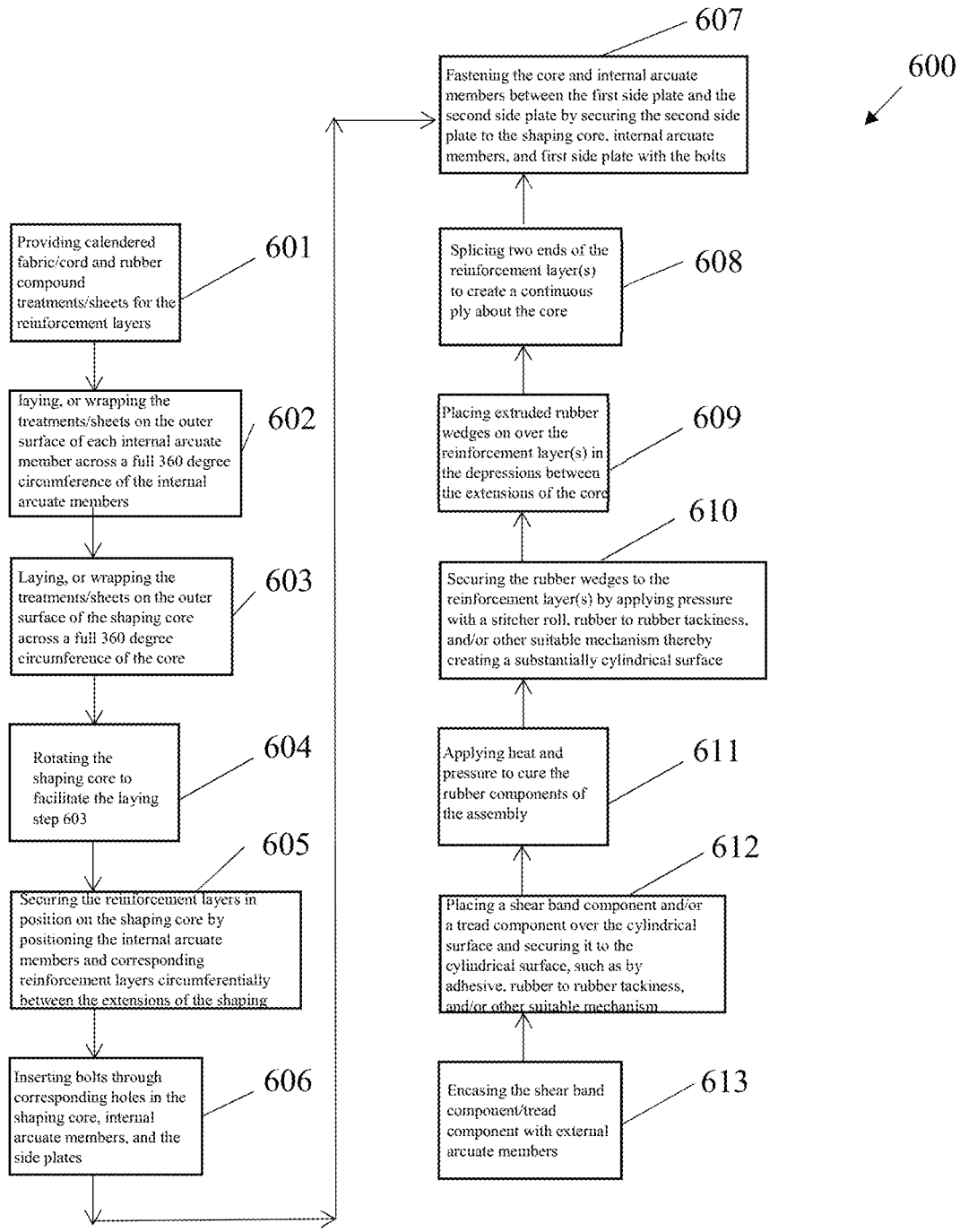
FIG. 11 is a schematic illustration of a method in accordance with the present invention.

As shown in FIG. 10, a tire assembly 300 may have a spoke structure 310 defining a plurality of alternating closed egg-shaped cavities 311 and open rectangular inlet openings 312 disposed concentrically about the inner central rim allowing the spoke structure to deflect under load thereby defining a suitable balance between flexibility for ride comfort and traction within a footprint of the assembly 300 and stiffness for vehicle handling, low rolling resistance, and low heat build-up within the spoke structure. The spoke structure 310 may further define a plurality of triangular openings 345 disposed at the outer flexible ring and between the cavities 311 and the inlet openings 312 (FIG. 10).

The cavities 311 of the spoke structure 310 may further define openings for arms of an inner central rim to extend therethrough and secure the spoke structure to the inner central rim, as described above. The arms may engage portions of the spoke structure 310 in a mechanical interlocking arrangement. The inner central rim may further include plates that, along with the arms may sandwich portions of the spoke structure 310 and create a further frictional and/or adhesive securement between the inner central rim and the spoke structure. The spoke structure 310 may comprise a homogenous or heterogeneous polymer and/or a filled polymer.

Spokes 315 of the spoke structure 310 may be curved inwardly or outwardly for mitigating or enhancing buckling of the spokes. The spokes 315 may include one or more reinforcing layers 319. The layer(s) 319 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier to 9000 denier. The polymeric film may be from 0.1 mm to 2.0 mm thick. The reinforcement in the spokes 315 may be oriented at angle between 0 degrees and 90 degrees. The spokes 315 may be continuously reinforced across their entire axial length. Continuous reinforcement layer(s) 319 may extend radially outward to multiple locations adjacent to a shear band 343 at the outer flexible ring. Other reinforcement layers 319 may extend about the interior of the closed cavities 311. The continuous reinforcement layer(s) 319 may be integrated into the spoke structure 310 and the outer flexible ring. Alternatively, the shear band 343 may be attached to the spoke structure 310 by between 20 and 60 connection points (e.g., cohesion, adhesive, fused, welded, etc.).

Each cavity 311 and inlet opening 312 may have a common cross sectional profile about the axis of rotation of the assembly. Further, each cavity 311 and inlet opening 312 may have a common axial length equal to a uniform axial thickness of the spoke structure 310. Each cavity 311 may be curvedly shaped to prevent "pinch" points on the reinforcement layer(s) 319 and mitigate compressive stress concentrations on the reinforcement layer(s). The number of cavities 311 may be between 15 and 60 for large scale assemblies.

As shown in FIGS. 1-8, a system 200 or method of manufacturing a tire, such as the example assembly 300, may include a core 210 having a cylindrical hub 211 and radially protruding extensions 212 (10 shown in FIG. 1) projecting radially outward from the hub. The system 200 may further include a plurality of internal arcuate members 220 for positioning the reinforcing layer(s) 319 about the core 210. The internal arcuate members 220 and the core 210 may be positioned by a shaft/axle 235, a first side plate 230 and bolts 221. A second side plate 240 may fully axially secure the core 210 and internal arcuate members 220 to each other. A plurality of external arcuate members (not shown) may encase the tire assembly 300, as well as the core 210, the internal arcuate members 220, first side plate 230, and second side plate 240, to form a system 200 and thereby cure the tire assembly.

Figure 1:
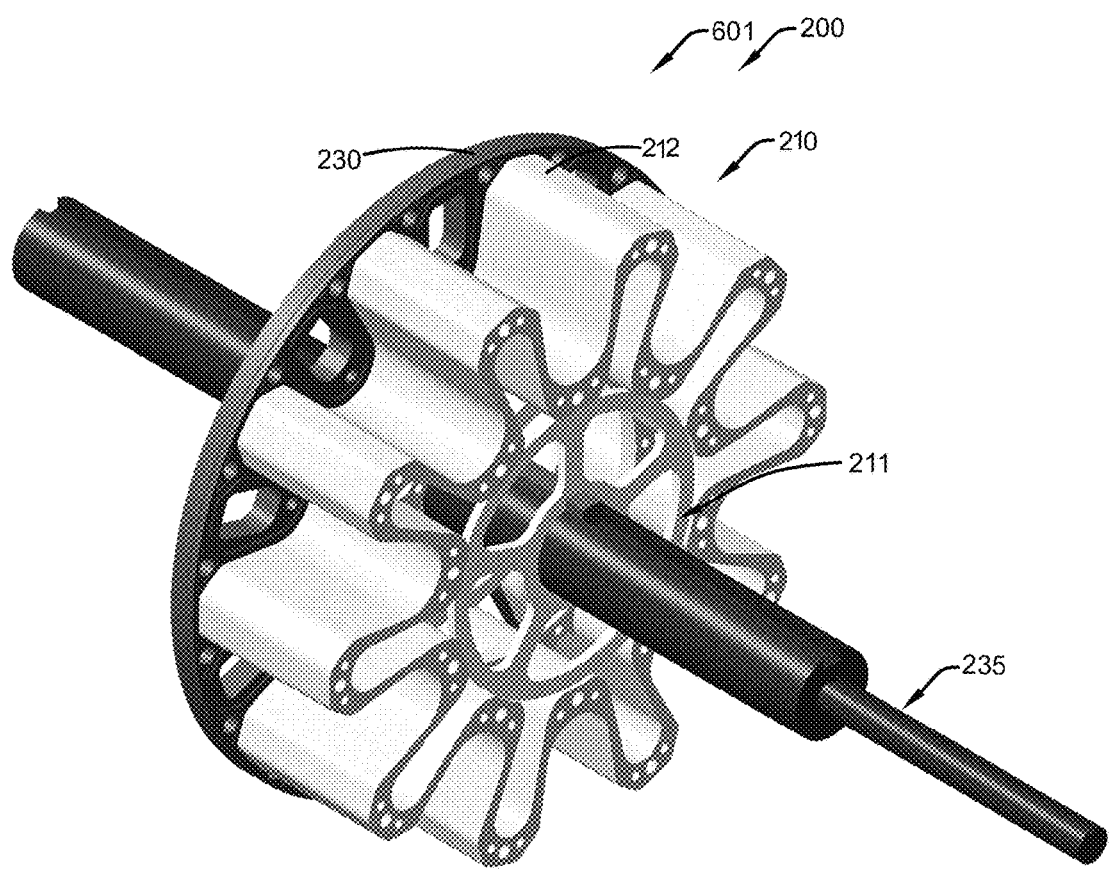
FIG. 1 is a schematic perspective view of part of an example assembly in accordance with the present invention.
Figure 2:
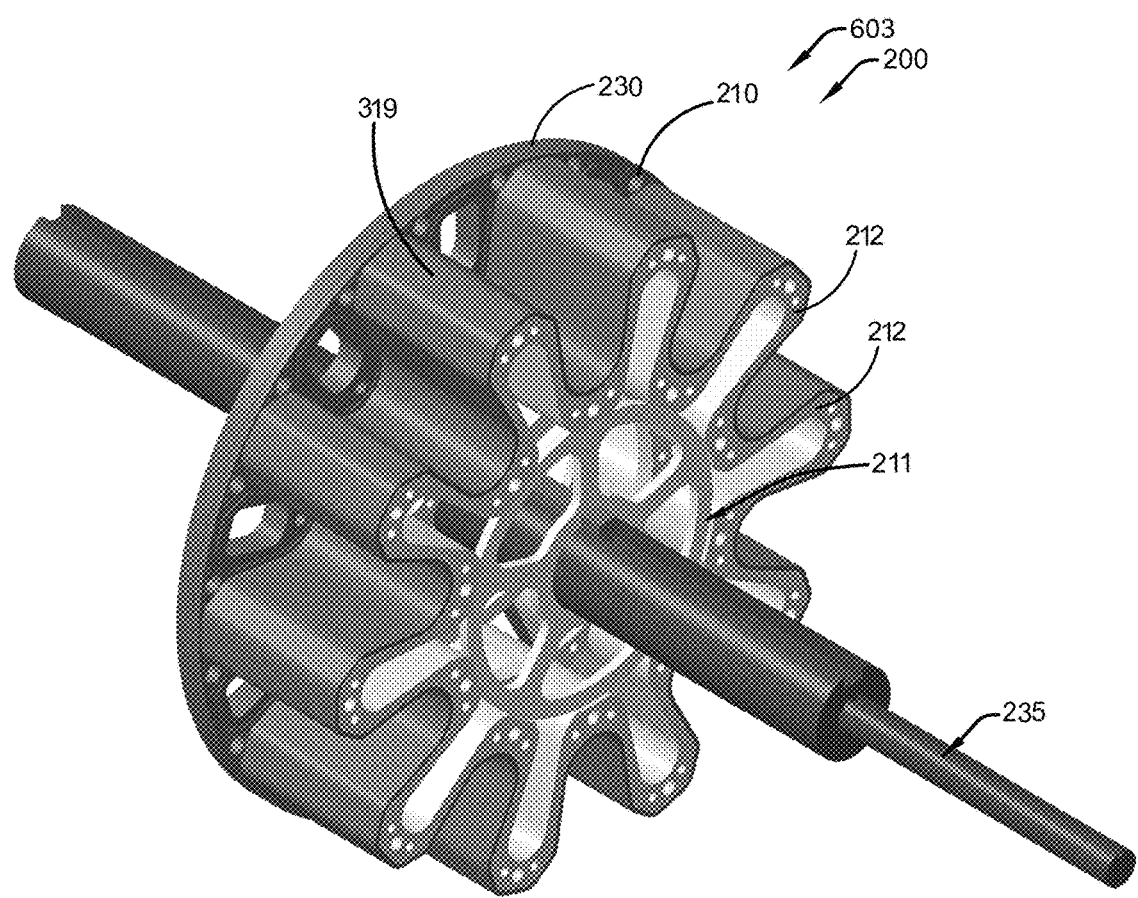
FIG. 2 is a schematic perspective view of another part of the example assembly added to the part of FIG. 1.
Figure 3:
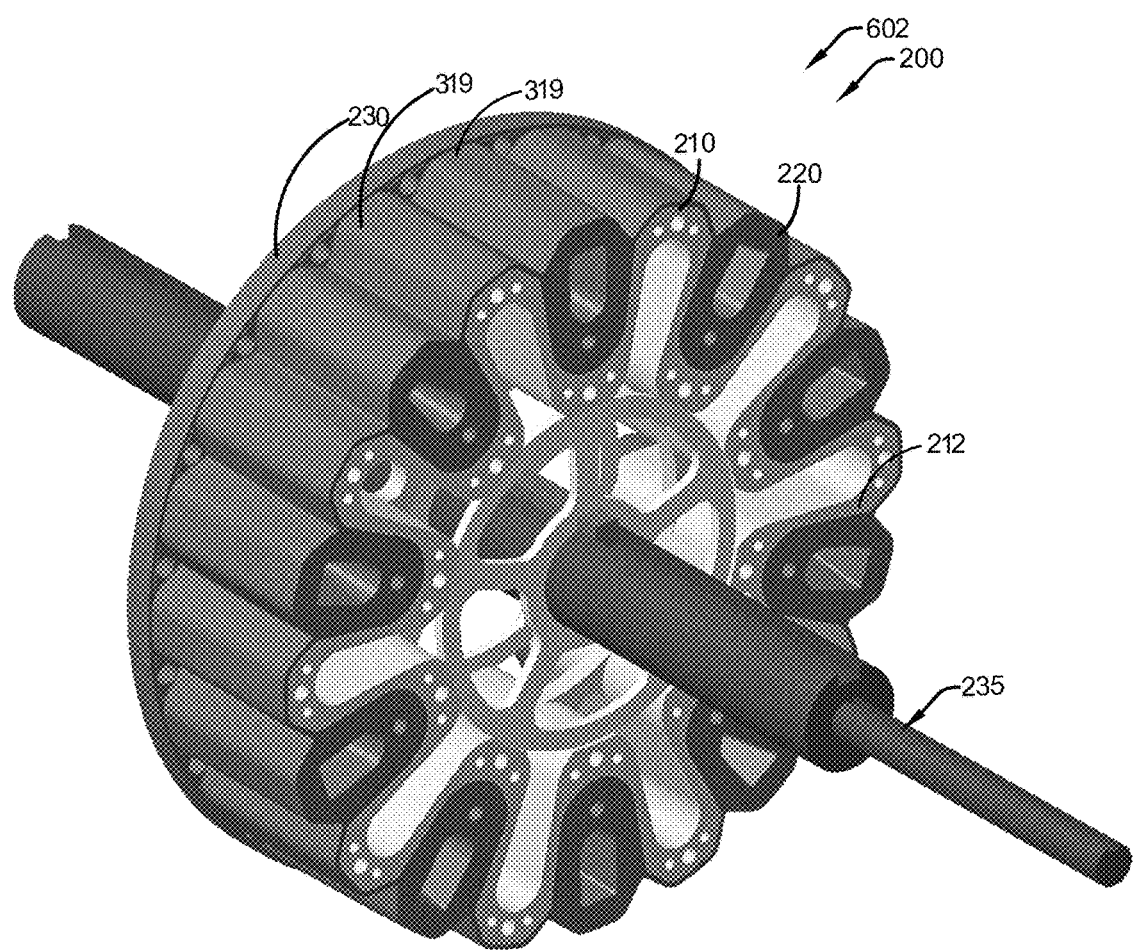
FIG. 3 is a schematic perspective view of still another part of the example assembly added to the parts of FIG. 2.
Figure 4:
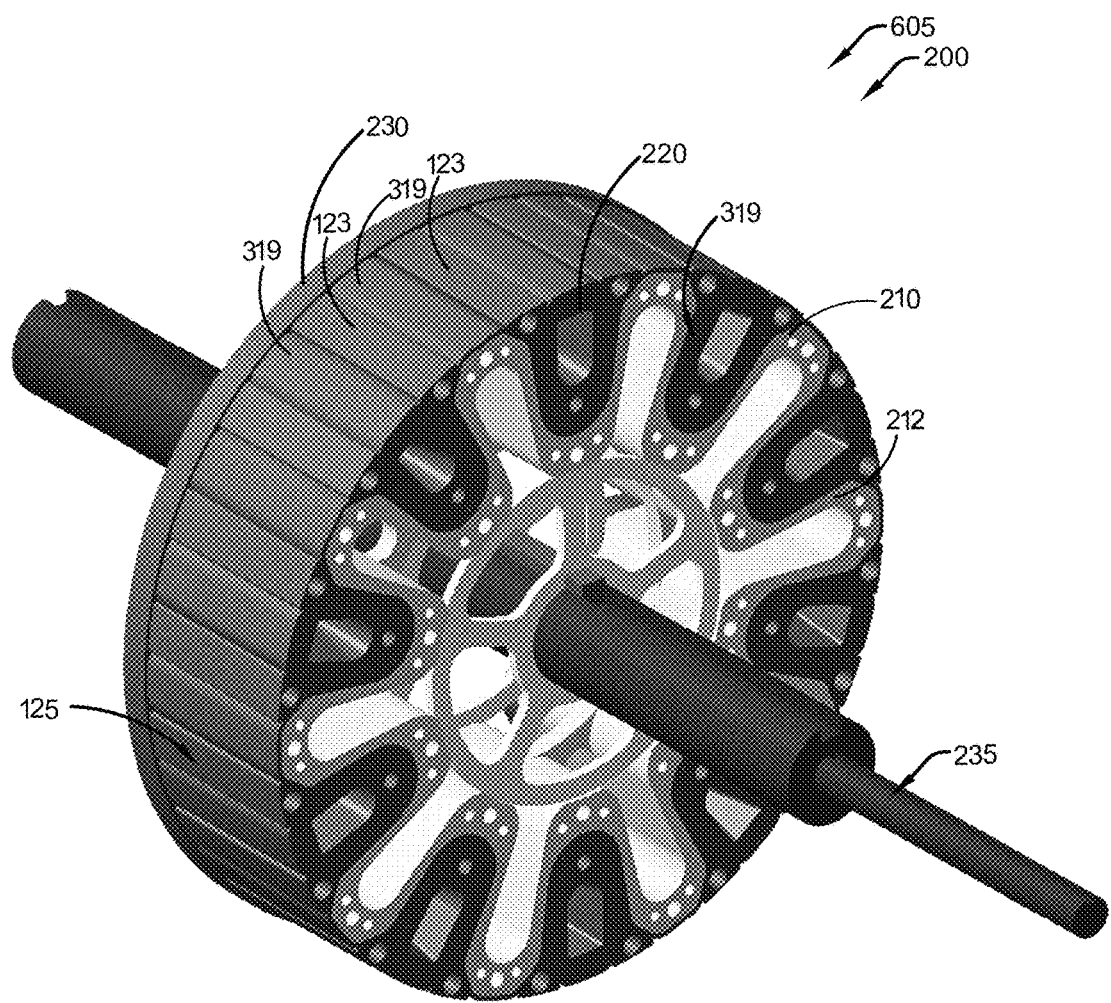
FIG. 4 is a schematic perspective view of yet another part of the example assembly added to the parts of FIG. 3.
Figure 5:
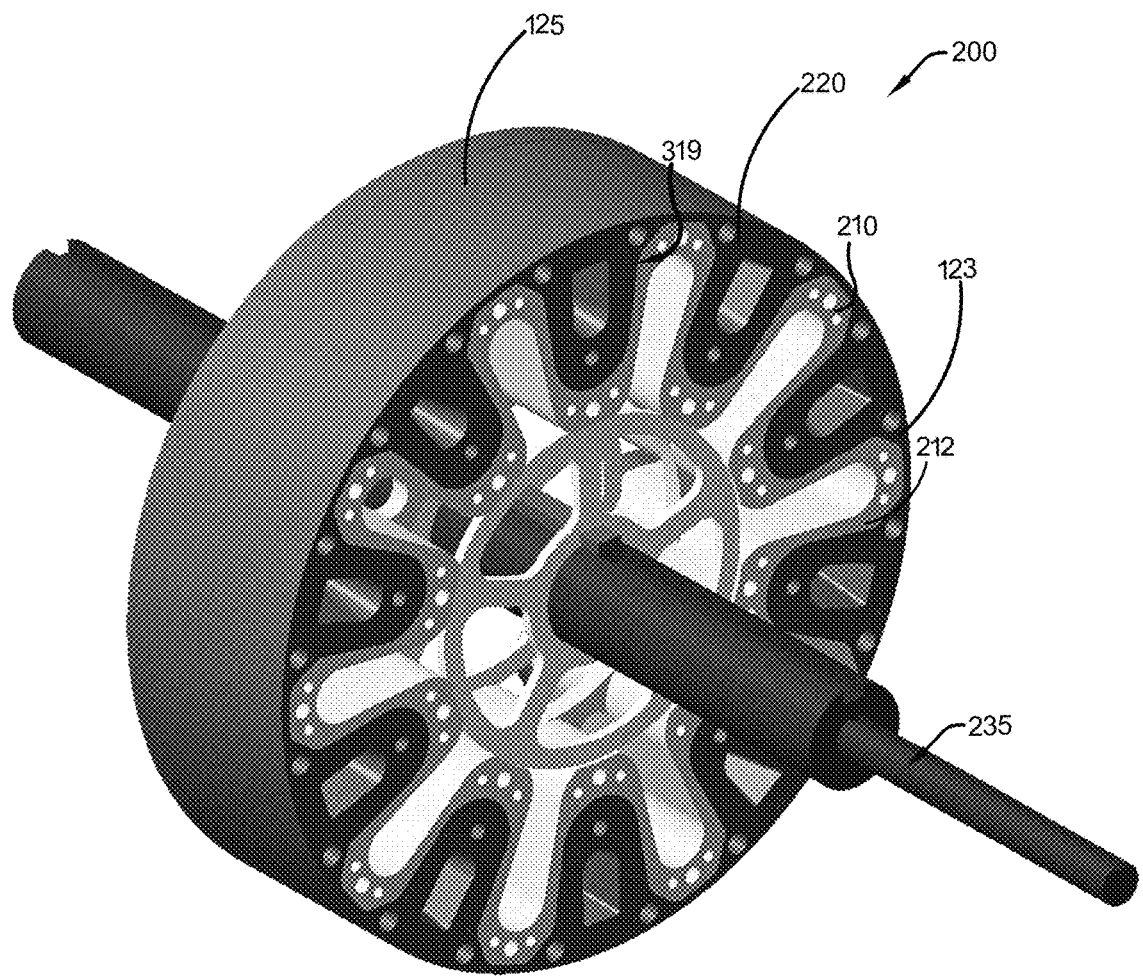
FIG. 5 is a schematic perspective view of yet another part of the example assembly added to the parts of FIG. 4.
Figure 6:
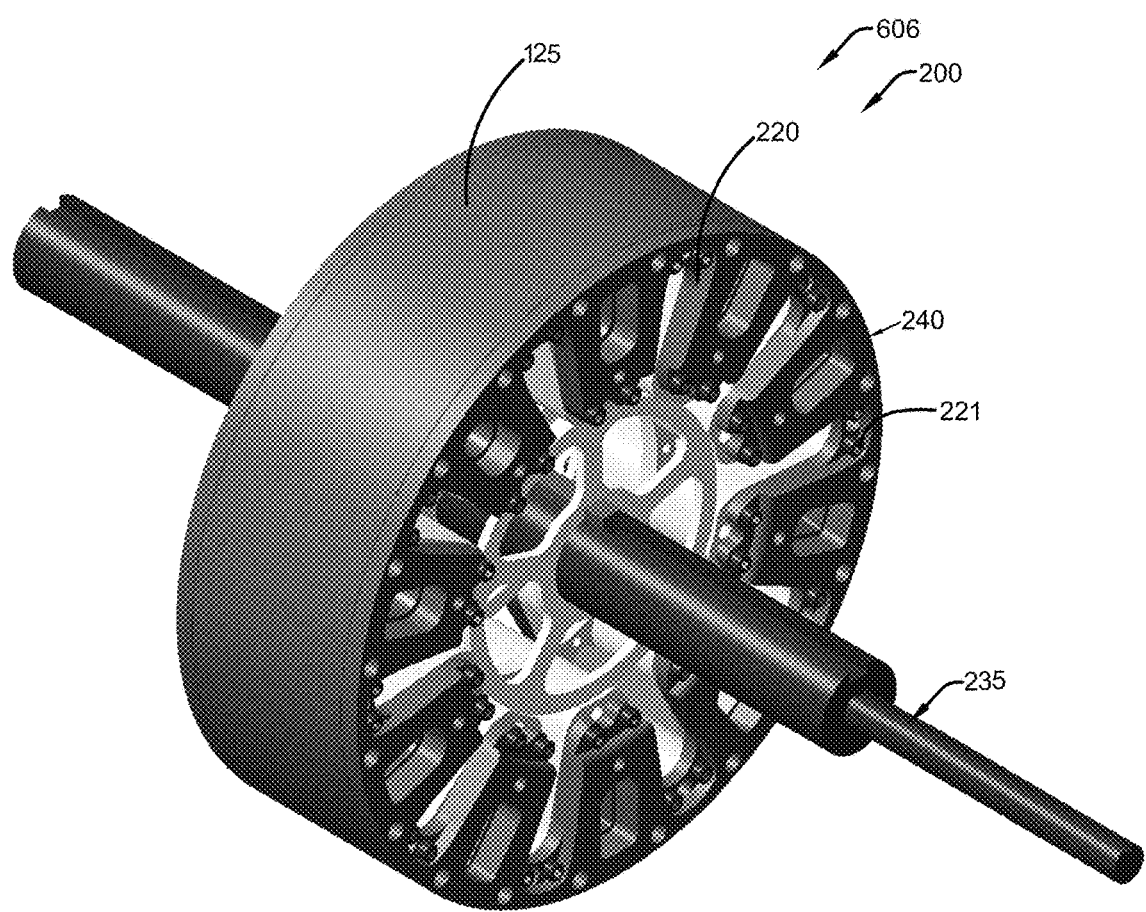
FIG. 6 is a schematic perspective view of yet another part of the example assembly added to the parts of FIG. 5.
Figure 7:
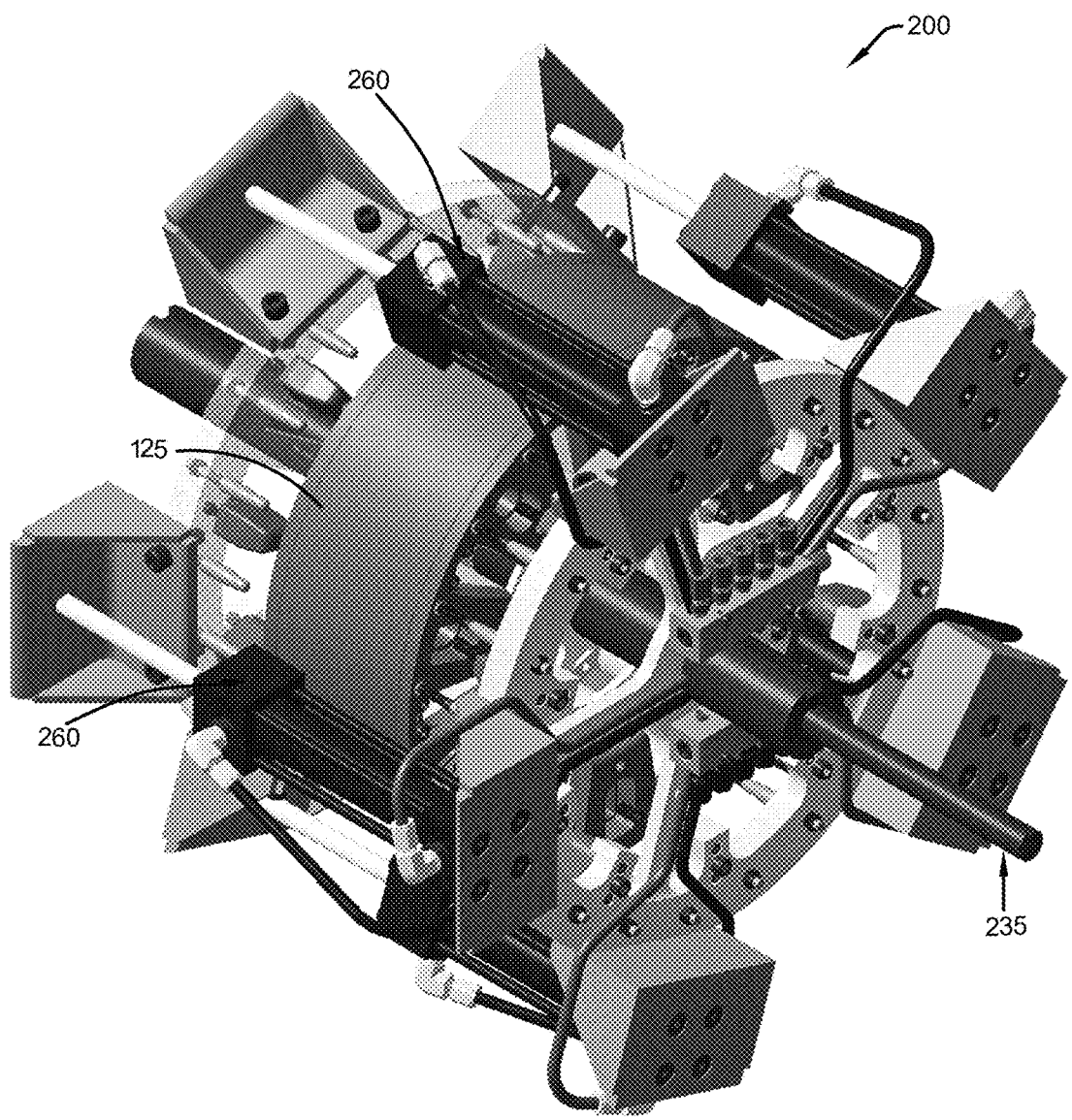
FIG. 7 is a schematic perspective view of yet another part of the example assembly added to the parts of FIG. 6.
Figure 8:
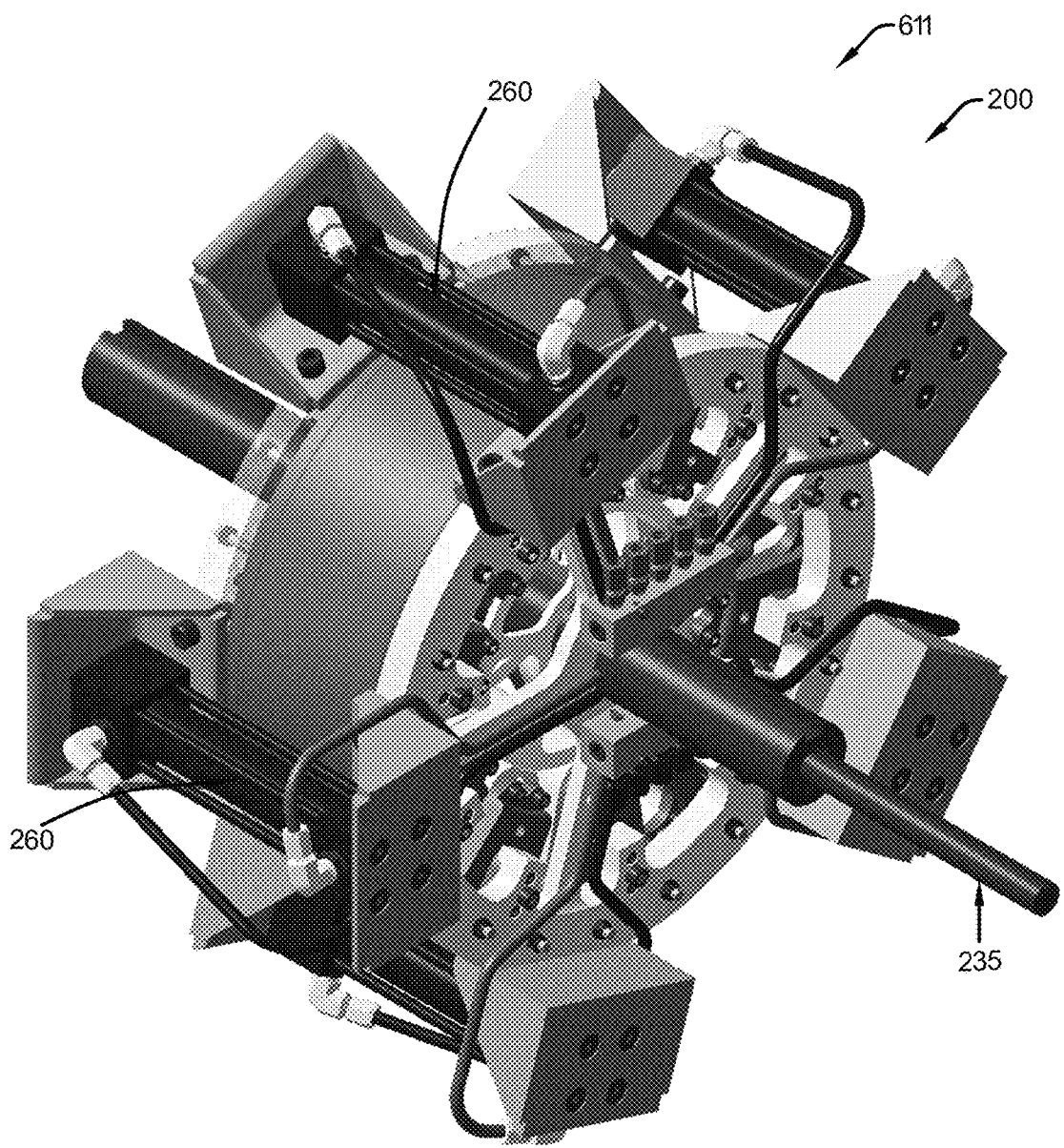
FIG. 8 is a schematic perspective view of the example assembly FIG. 7 under a different condition.
Figure 9:
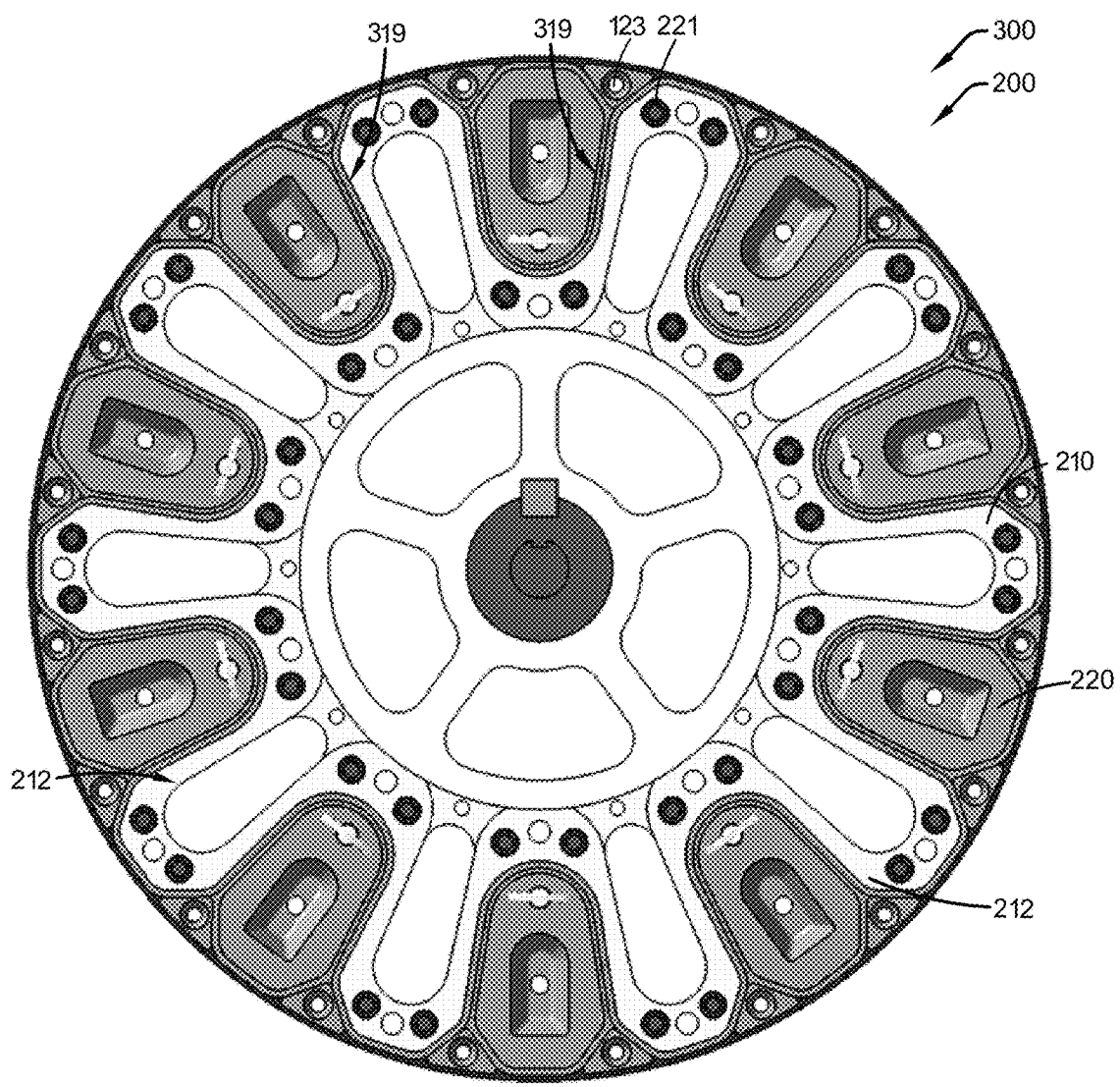
FIG. 9 is a schematic elevation view of the example assembly along with a tire/wheel assembly produced by the example assembly.

The above described system 200 may be utilized with the following method 600 (FIGS. 1-9 & 11) for manufacturing a non-pneumatic tire, such as the example assembly 300 (FIG. 10). Such a method 600, in accordance with the present invention, may include the steps of: providing 601 calendered fabric/cord and rubber compound treatments/sheets 319 for the reinforcement layers; laying, or wrapping, 602 the treatments/sheets 319 on the outer surface of each internal arcuate member 220 across a full 360 degree circumference of the internal arcuate members 220; starting from a valley or peak position, laying, or wrapping, 603 the treatments/sheets 319 on the outer surface of the shaping core 210 across a full 360 degree circumference of the core 210; rotating 604 the shaping core 210 to facilitate the laying step 603; securing 605 the reinforcement layers 319 in position on the shaping core 210 by positioning the internal arcuate members 220 and corresponding reinforcement layers 319 circumferentially between the extensions 212 of the shaping core 210; inserting 606 bolts 221 through corresponding holes in the shaping core 210, internal arcuate members 220, and the side plates 230, 240; fastening 607 the shaping core 210 and internal arcuate members 220 between the first side plate 230 and the second side plate 240 by securing the second side plate 240 to the shaping core 210, internal arcuate members 220, and first side plate 230 with the bolts 221; splicing 608 two ends of the reinforcement layer(s) 319 to create a continuous ply about the shaping core 220; placing 609 metal or other suitable material wedges 123 on over the reinforcement layer(s) 319 in the depressions between the extensions 212 of the shaping core 210 and the internal arcuate members 220; securing 610 the wedges 123 to the reinforcement layer(s) 319 thereby creating a substantially cylindrical surface 125; applying 611 heat and pressure to shape the rubber components of the tire assembly 300; placing 612 a shear band component and/or a tread component 343 over the cylindrical surface 125 and securing it to the cylindrical surface 125, such as by adhesive, rubber to rubber tackiness, and/or other suitable mechanism; and encasing 613 the shear band component/tread component 343 with external arcuate members (not shown). The shaping core 210, wedges 123, and internal arcuate members 220 may be heated electrically, by steam, and/or other suitable method. The first and second side plates 230, 240 may further include spring loaded vents for relieving pressure from expansion of the shear band component/tread component 343 during the application step 611. Pressure may be applied by hydraulic cylinders 260 (FIG. 7-8).

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A system for manufacturing a tire assembly, the system comprising:
   a core having a cylindrical hub and radially protruding extensions projecting radially outward from the hub;
   a plurality of internal arcuate members for positioning a reinforcing layer about the core, each of the internal arcuate members each being wrapped with a reinforcement envelope, each of the internal arcuate members being disposed in spaces circumferentially between the extensions of the core;
   a first side plate for securing each of the internal arcuate members in place relative to the core; and
   a second side plate for securing the core and each of the internal arcuate members to each other wherein the reinforcing layer comprises calendered fabric and rubber compound treatments applied to an outer surface of the core across a full 360 degree circumference of the core with a shear band structure applied over the reinforcing layer.

2. The system as set forth in claim 1 wherein each reinforcement envelope comprises calendered fabric and rubber compound treatments.

3. The system as set forth in claim 1 wherein another reinforcing layer comprising calendered fabric and rubber compound treatments is applied to an outer surface of the core across a full 360 degree circumference of the core.

4. The system as set forth in claim 1 further including wedges disposed on each of the reinforcement envelopes in depressions between the extensions of the core and each of the internal arcuate members.

\* \* \* \* \*